United States Patent
Elstermann et al.

(10) Patent No.: US 9,479,834 B2
(45) Date of Patent: Oct. 25, 2016

(54) DISSEMINATING PROGRAM CONTENT VIA ALTERNATIVE NETWORKS

(71) Applicant: ARRIS Enterprises, Inc., Suwanee, GA (US)

(72) Inventors: Erik J. Elstermann, Carlsbad, CA (US); Michael A. Casteloes, Poway, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/534,141

(22) Filed: Nov. 5, 2014

(65) Prior Publication Data

US 2016/0127779 A1    May 5, 2016

(51) Int. Cl.
| | |
|---|---|
| *H04N 21/462* | (2011.01) |
| *H04N 21/435* | (2011.01) |
| *H04N 21/647* | (2011.01) |
| *H04N 21/43* | (2011.01) |
| *H04N 21/4402* | (2011.01) |
| *H04N 21/44* | (2011.01) |
| *H04N 21/2343* | (2011.01) |
| *H04N 21/23* | (2011.01) |
| *H04N 21/234* | (2011.01) |

(52) U.S. Cl.
CPC ......... *H04N 21/4622* (2013.01); *H04N 21/23* (2013.01); *H04N 21/234* (2013.01); *H04N 21/23424* (2013.01); *H04N 21/23439* (2013.01); *H04N 21/43* (2013.01); *H04N 21/435* (2013.01); *H04N 21/4307* (2013.01); *H04N 21/44* (2013.01); *H04N 21/44016* (2013.01); *H04N 21/44029* (2013.01); *H04N 21/64746* (2013.01)

(58) Field of Classification Search
None
See application file for complete search history.

(56) References Cited

U.S. PATENT DOCUMENTS

| | | | | |
|---|---|---|---|---|
| 5,235,643 | A | * | 8/1993 | Anderson ............... H04N 5/44 348/E5.096 |
| 6,061,727 | A | * | 5/2000 | Simonoff ................ G06F 8/38 709/202 |
| 6,477,580 | B1 | | 11/2002 | Bowman-Amuah |
| 8,270,413 | B2 | | 9/2012 | Weill et al. |
| 2005/0015816 | A1 | * | 1/2005 | Christofalo ........... H04N 7/165 725/136 |
| 2008/0056123 | A1 | * | 3/2008 | Howard .............. H04L 41/0663 370/225 |
| 2013/0205315 | A1 | * | 8/2013 | Sinha .................... G06T 1/0021 725/14 |

\* cited by examiner

*Primary Examiner* — Justin Shepard
(74) *Attorney, Agent, or Firm* — Thomas A. Ward

(57) ABSTRACT

A system is provided for coordinating the presentation of program content received from a first network and a second network independent from the first network. The system uses heartbeat messages typically transmitted along communication paths to monitor the operation of the communications paths to transmit information necessary for stream switching to alternate programming or alternate sources of the same programming.

7 Claims, 9 Drawing Sheets

DISSEMINATING PROGRAM CONTENT VIA ALTERNATIVE NETWORKS

BACKGROUND

1. Field of the Invention

The present invention relates to systems and methods for disseminating data, and in particular to a system and method for transmitting program content via alternative or backup networks.

2. Description of the Related Art

The dissemination of media programs such as television broadcasts and movies in digital form has become commonplace. Such dissemination typically involves a first transmission from a content provider (e.g. ESPN, NBC, HBO) that generates or otherwise obtains the media program, to a service provider (e.g. DIRECTV, DISH, TIME WARNER CABLE), and a second transmission of the media program from the service provider to subscribers or other customers for reception and viewing.

Digitized media programs are quite large, often gigabits in size. Hence, digitized media programs are typically compressed to reduce their size and bit rate to values supportable by the communications system over which the media program is transmitted. This is the case for both the first transmission from the content provider to the service provider, and for transmission from the service provider to the customer.

The encoders performing such compression can be set to provide encoded media programs of selectable frame rates and resolutions, with higher resolution and frame rate media programs requiring greater bandwidth for transmission. Because the quality of the media program ultimately received by the subscriber can be no better than the quality of the media program transmitted from the content provider to the service provider, the media programs are increasingly transmitted via high bandwidth terrestrial/fiber communications systems. This permits delivery of media programs of high resolution and frame rate. The service provider may then decode and re-encode the delivered media programs to a frame resolution and frame rate that are suitable for the communication link to the subscriber and the desired image quality.

In many cases (for example, with live feeds), the media program is transmitted from the content provider to the service provider and the subscribers more or less in real time (e.g. with perhaps a short delay for processing and to permit inappropriate subject matter to be excised before transmission). In such circumstances at least, even occasional temporary outages in the communication link between the content provider and the service provider are unacceptable. Accordingly, backup communication links are used to allow service providers to obtain the program content via other means. However, such backup communication links are of little value if the service provider cannot accurately and rapidly associate the program content obtained via the backup communications link with the program content that was lost via the primary communication link.

What is needed is a system and method for reliably and unambiguously transmitting data that can be used to associate program content from primary and back up communication links and sources. The system and method transmitting this information should preferably not require any change in existing transmission protocols, nor require significant increases in the required bandwidth of the primary and/or backup communications links. The system and method should also preferably piggyback on transmissions that themselves implicate the need to use the backup program content, so that the proper functioning of one transmission assures that the proper program content is chosen for backup. This disclosure presents a system and method that satisfies this need.

SUMMARY

To address the requirements described above, the following discloses a method, apparatus, article of manufacture, for coordinating the presentation of program content received from a first network and a second network independent from the first network. The method, apparatus, and article of manufacture may be applied in a communication system transmitting program content via communication paths verified as operational via transmission of heartbeat messages. In one embodiment, the method comprises receiving a first program content stream having the program content from the first network via a first communication path, the first program content stream having a recurring first heartbeat message augmented to include identifying information that uniquely identifies the media program; receiving at least a portion of a second program content stream having the program content from a second network via a second communication path, the second program content stream having a recurring second heartbeat message including the identifying information; and automatically identifying the program content using the identifying information and associating the identified program content with the first network and the second network. In another embodiment, the unique features are embodied by an apparatus comprising a stream switcher. The stream switcher includes: a first input coupled to receive a first program content stream having the program content from the first network via a first communication path, the first program content stream having a recurring first heartbeat message augmented to include identifying information that uniquely identifies the media program; a second input coupled to receive at least a portion of a second program content stream having the program content via a second network via a second communications path, the second program content stream having a recurring second heartbeat message including the identifying information; a parser, coupled to the first input and the second input, the parser for parsing the first program content stream and the second program content stream to automatically identify the program content using the identifying information; a stream correlator, coupled to the parser, for associating the identified program content with the first network and the second network; and a switch, coupled to the stream correlator, for providing one of the first program content stream and the second program content stream to a stream switcher output according to availability of the first media stream.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
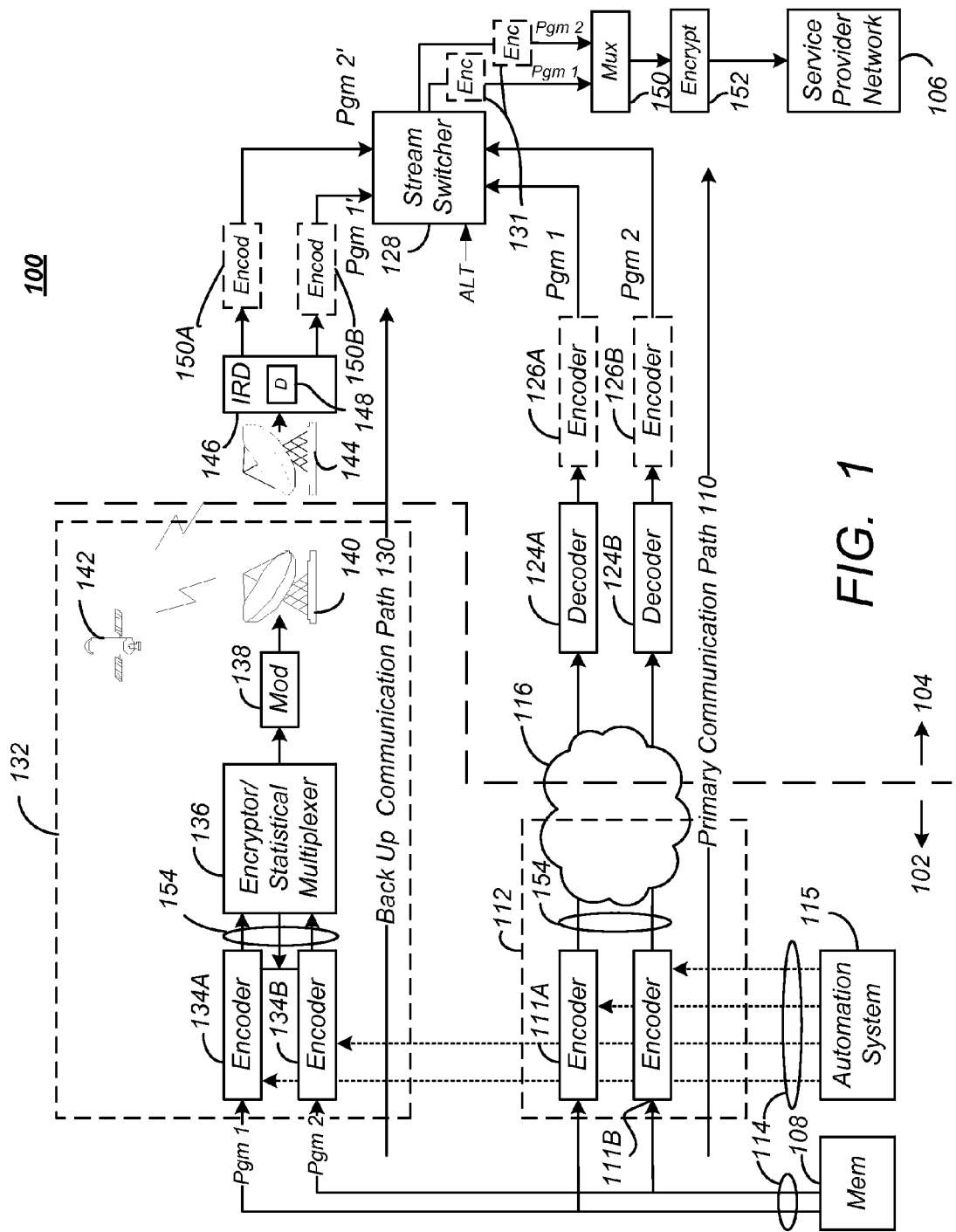
FIG. 1 presents a diagram of a communication system for dissemination of media content.

FIG. 1 presents a diagram of a communication system 100 for dissemination of media content. The communications system 100 comprises a one or more program content providers 102 and one or more service providers 104. Each content provider 102 transmits program content to the one or more service providers 104, and each service provider 104 transmits the received program content to their customers via a service provider network 106. Typically, the service provider 104 obtains program content from multiple content providers 102, and combines such program content from different program providers 102 onto one or more data transport data streams that are transmitted to the subscribers. The service provider network 106 may comprise, for example, a terrestrial cable network, a terrestrial wireless network, or a satellite network.

The program provider 102 generates or otherwise obtains program content (alternatively referred to hereinafter as media programs) and may store it in memory 108 for later dissemination. The program provider 102 retrieves the program content (illustrated as Pgm 1 and Pgm 2 in FIG. 1) and provides the program content for transmission to the service provider 104 on a primary communication path 110 via a primary transmission network 112, and via a back up communication path 130 using the back up transmission network 132 as further described below.

As the program content is typically in digital form and large in size, the program content is typically compressed or otherwise encoded before transmission to the service provider 104. This is performed by primary program provider encoders 111A, 111B (hereinafter alternatively referred to as primary program provider encoders 111) which encode the program content according to selectable frame rates, resolutions, and other parameters. In the illustrated embodiment, each media program (for example, Pgm 1 and Pgm 2) has a dedicated primary program provider encoder 111, but a single encoder 111 may be used that is capable of processing combined or multiple streams.

The primary program content can be provided to the primary program provider encoders 111 according to an auxiliary content insertion cueing message protocol 114 such as is defined by Society of Cable Telecommunications Engineers (SCTE) 104, entitled "Automation System to Compression System Communications Application Program Interface (API)," by Society of Cable Telecommunications Engineers, Inc. (2004), which is hereby incorporated by reference herein. The SCTE 104 protocol describes a communications application program interface (API) between an automation system 115 that automates the provision of the program content and the associated compression and encoding elements 111 of the primary transmission network 112, and is described in further detail below.

Typically, primary program provider encoders 112 comply with the moving pictures experts group (MPEG) encoding standard, and are set to encode the digitized program content according to a frame rate and resolution that provides very high quality video. The result is a program stream having the program content.

The encoded program content is transmitted in a program stream by the primary transmission network 112 to the service provider 104. In one embodiment, this is accomplished by use of a high bandwidth communications network, such as is available through a media 116 implemented by a fiber optic terrestrial network.

The program stream having the encoded program content is received by the service provider 104. The program stream is provided to primary service provider decoders 124A, 124B (hereinafter alternatively referred to as primary service provider decoders 124). Primary service provider decoders 124 decode (decompress) the program stream having the encoded program content using techniques complementary to those employed by primary program provider encoders 111. Primary service provider encoders 126A, 126B (hereinafter alternatively referred to as primary service provider encoders 126) re-encode (compress) the program stream program content into the encoded form used to transmit the program content to customers via the service provider network 106. Primary service provider encoders 126 are typically set to encode the program content to lower frame rates and resolutions than primary program provider encoders 110. The encoded program streams are provided to the stream switcher 128.

Typically, the program content provided by the program provider 102 includes temporal portions into which the service provider 104 is permitted to insert other program content, such as advertisements. For example, the program content may be a sporting event, and the program provider 102 may identify portions of the program content (e.g. during time outs and other interruptions in activities) in which the service provider 104 may insert advertisements or alternative content. Such advertisements or alternative content (denoted ALT in FIG. 1) may be switched into the output streams provided to the service provider network 106 at the appropriate time via stream switcher 128.

The stream switcher 128 provides the output program streams to a multiplexer 150 that multiplexes the program streams into a transport stream having the programs, and the transport stream is transmitted to customers via the service provider network 106.

In an alternative embodiment, encoders 126 are omitted in favor of performing the encoding process after stream switching, as shown in blocks 131. Also, the transport stream may be encrypted with one or more encryptors 152 before transmission by the service provider network 106 to end customers. Alternatively, encryption may be performed on the programs after encoding and before stream switching.

Auxiliary content insertion cueing message protocols have been developed for providing information from the program provider 102 to the service provider 104 signaling when and in which circumstances alternate program content may be inserted or spliced into the output stream. Protocols have been established by the Society of Cable Telecommunications Engineers (SCTE). One protocol is defined by "Automation System to Compression System Communications Application Program Interface (API)", known as SCTE 104, discussed above. Another protocol is defined by "Digital Program Insertion Cueing Message for Cable," otherwise known as SCTE 35, also published by the Society of Cable Telecommunications Engineers, (2013), which is also incorporated by reference herein. The SCTE protocol standards provide a method for in-band signaling of splice events using splice commands to downstream splicing equipment. Signaling a splice event identifies a splice point within a stream in which other program content may be inserted.

SCTE 104 (illustrated in FIG. 1 as protocol 114) defines the communications API between the source of the media stream and the compression elements (e.g. encoders 111) of the program provider 102. SCTE 35 (illustrated in FIG. 1 as protocol 154) defines a standard for splicing program content data into program streams or transport streams, usually for the purpose of inserting other digital media programs (e.g. advertisements and other content) within that transport stream. The standard defines a means to signal splicing of the media programs within the stream at appropriate times. The technique carries notification of upcoming splice points and other timing information within the transport stream, as defined by the automation system 115. In one embodiment, this is accomplished via use of a splice information table that is transmitted to downstream devices to notify them of splice events, such as a network break or return from a network break. The splice information table, which typically associated with a particular program, is carried in one or more program identifiers (PID(s)) within a transport stream referred to by that program's Program Map Table (PMT). Stream switcher 128 can be used to selectably provide the alternate program content in the output stream, based on the information provided by the splice information table and signaling protocol defined above.

The equipment used to signal splice events may also be used to send messages at intervals that do not indicate a splice point. Such messages can comprise heartbeat messages which help insure the proper operation of the system 100 by confirming that the primary communication path 110 is operational. This can be performed by issuing recurring messages to receiving devices. If the expected message is not received in an appropriate time interval, a device expecting to receive such a message can conclude that the communications path 110 has been compromised, and alarm an operator to a possible loss of the primary communication path 110 or other system 100 malfunction.

An example of such messages is included in sections 8.6.2.1, 8.8.2, and 8.6.3.1 of SCTE 104 which defines a splice_null_request_data( ) message sent to the encoders 111. The SCTE 104-compliant splice_null_request_data( ) message can be used as "heartbeat" message to signal the primary program provider encoders 111 or other devices to generate an SCTE 35-compliant splice_null message that is transmitted to the service provider 104 in the program stream. This splice_null( ) message can be used as a "heartbeat" message to detect whether the primary communications path 110 has been severed. Another such message (although not automatically triggering an appropriate message by the encoders 111) is an alive request message defined in section 8.2 of the SCTE 104 specification.

As shown in FIG. 1, program content is also provided to the stream switcher 128 using back up transmission network 132 via a backup communication path 130. For purposes of illustration, the backup communications path 130 is implemented via a satellite transmission system. However, the backup communications path 130 may instead (or in addition) be implemented with elements analogous to those of the primary communication path 110 (e.g. via elements matching encoders 111, medium 116, decoders 124 and encoders 126).

The satellite transmission system includes encoders 134A, 134B (hereinafter alternatively referred to as backup encoders 134), one or more multiplexers 136, each coupled to one or more of the backup encoders 134, one or more modulators 138, one or more uplink antennas 140, and one or more satellites 142. Typically, each satellite 142 comprises a plurality of transponders, wherein each transponder receives a multiplexed data stream from an associated one of the multiplexers 136, and transmits that data stream to the downlink antenna 144 disposed at or near the service provider 104 facility.

The digitized program content (Pgm 1 and/or Pgm 2) may be provided to the backup transmission network 132 and backup encoders 134 in a manner analogous to the means by which it is provided to the primary transmission network 112. As was true with the primary transmission network 112, the backup encoders 134 employed in the backup transmission network 112 can be dedicated to each media program (e.g. Pgm 1 or Pgm2) or can be an encoder 134 capable of encoding combined or multiple streams. The encoders 134 are set to encode the program content according to desired frame rates, resolutions, and other parameters in the same way that the primary encoders 110 described above. As the backup communication path 130 is for purposes of providing the program content in the event of a failure or outage of the primary communication path 110, and because the backup transmission network 132 may provide less data throughput than the primary communications network 112, encoders 134 may be set to a frame rate and resolution less than that of primary encoders 110. However, this need not be the case, as primary encoders 110 and backup encoders 134 may be set to any desired frame rate and resolution.

The encoded program content for each media program is then provided to a multiplexer 136 to combine the encoded program content of multiple streams (each representing one media program, e.g. Pgm 1 or Pgm 2) to create a single stream. The stream output from each multiplexer 136 is modulated by modulator 138 to generate an uplink signal having the data stream, and the uplink signal is provided to the uplink antenna 140 for transmission to the satellite 142. Each transponder on the satellite 142 receives uplink signal transmitted by the uplink antenna 140, and re-transmits this signal as a downlink signal to the downlink antenna 144. Although not necessary, the transponders may alter the transmission parameters (e.g. frequency, bandwidth, modulation and or coding technique) of the uplink signal received from the uplink antenna 140 when generating the downlink signal.

The downlink antenna 144 receives the downlink signal from the satellite 142, and provides the signal to a receiver such as an integrated receiver/decoder 146. The integrated receiver/decoder 146 may comprise one more decoders 148 to decode each stream having program content to reproduce the program content presented to backup encoders 134. If decoded by decoder 148, the streams are then encoded by service provider backup encoders 150A, 150B (alternatively referred to as service provider backup encoders 150) and provided to the stream switcher 128.

Although not illustrated above, to prevent unauthorized access to the program content, either or both the primary communication path 110 and the backup communication path 130 may encrypt the encoded data streams carrying the program content before transmission via medium 116 or the uplink antenna 140. In the primary communication path 110, this can be implemented by use of encryption devices interposed between encoders 111 and the medium 116 and associated decryption devices interposed between the medium 116 and decoders 126. Similarly, the program content transmitted via the backup communication path 130 may be encrypted by one or more encryption devices interposed between backup encoders 134 and the multiplexer 136 or between the multiplexer 136 and modulator 138. Similarly, the encrypted program content may be decrypted by one or more decryption devices in the IRD 146.

In one embodiment, the multiplexer 136 is a statistical multiplexer that is capable of dynamic bandwidth allocation (DBA). Typically, the bandwidth required for transmission of any particular data stream having a media program varies widely over time, as the scene and dynamics of the program content changes. To assure timely delivery of the data, the maximum bit throughput rate of the communication channel must be equal or greater to the maximum bit rate of the encoded data stream for the media program. Similarly, to be assured of transmitting all of the data streams without loss in a communication channel that combines multiple data streams (each representing a media program) into a single data stream, the communication channel must be capable of a bit throughput rate equal to the sum of the maximum bit rate of each of the program streams. However, it is unlikely that the maximum bit rate of any of the data streams will occur at the same time as the maximum bit rate of any of the other data streams. Accordingly, there is the potential for unused transmission throughput for much of the time. To obviate this problem, the statistical multiplexer commands the encoders 134 to dynamically alter one or more of the encoding parameters for each media program so that the total bit rate of all of the streams in the communication channel approach but do not exceed the bit throughput rate of the communication channel.

Although FIG. 1 illustrates a single multiplexer 136 multiplexing two data streams, each representing a media program, other configurations are possible. Typically, the backup transmission network 132 comprises a plurality of multiplexers 136, each multiplexing a plurality of program content data streams, with one multiplexer 136 devoted to each uplink signal transmitted to a transponder of the satellite 142. On the other hand, the bit throughput rate of the data stream of a media program may be so large as to allow only one media program to be transmitted on each communication channel of the backup communications network 132, thus eliminating the need for a multiplexer 136 at all.

Further, although FIG. 1 illustrates a backup communication path 130 implemented by a satellite transmission system, other implementations are possible. For example, the backup communication path 130 can be implemented by elements and structures analogous to the primary communication path 110.

Signaling Backup Program Content

Figure 2:
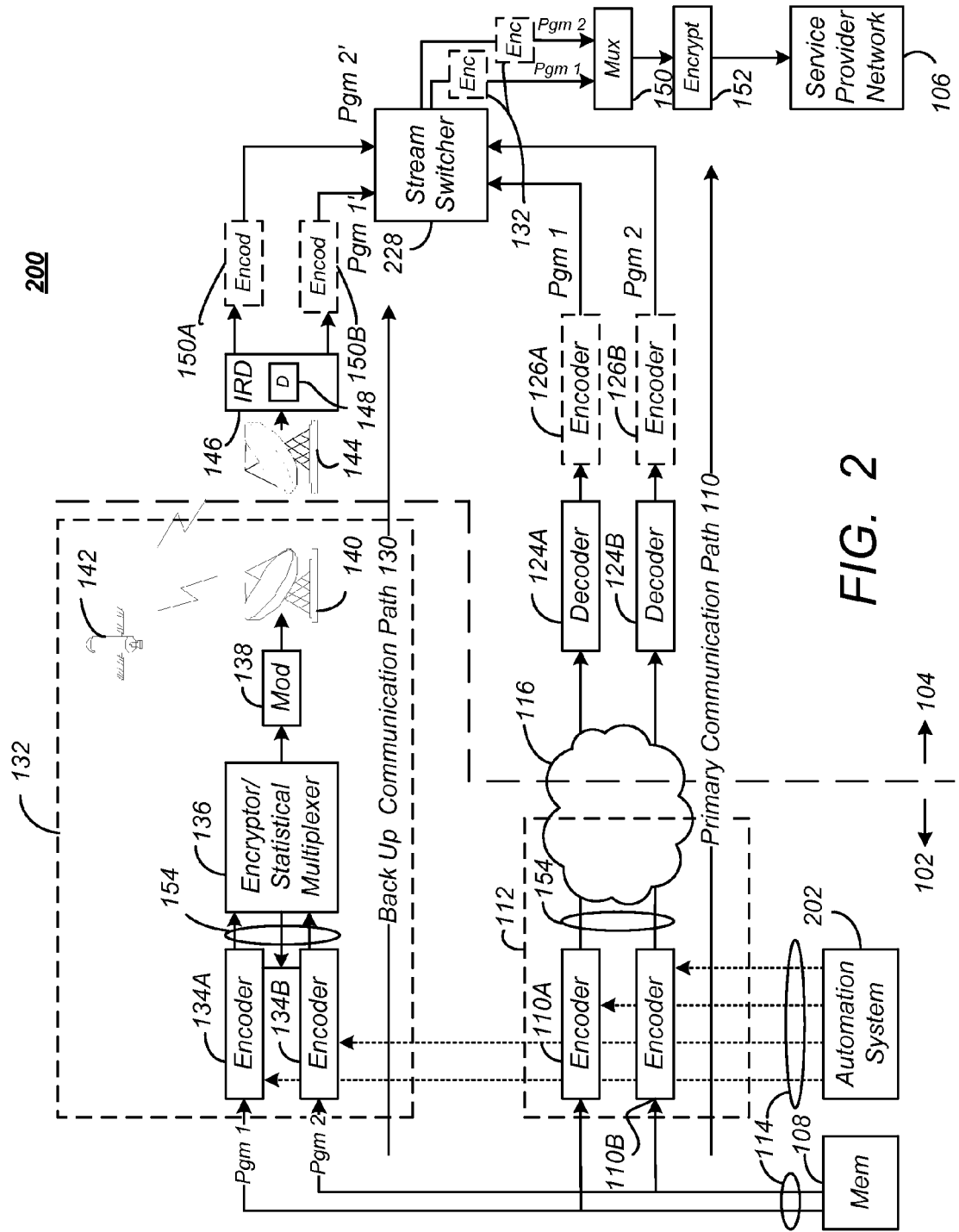
FIG. 2 is a diagram illustrating one embodiment of an improved communication system for dissemination of program content.

FIG. 2 is a diagram illustrating one embodiment of an improved communication system 200 for dissemination of program content. The improved communication system 200 includes the elements previously described with respect to the communication system 100 illustrated in FIG. 1, but also includes a modified automation system 202, and modified stream switcher 228 to allow it to respond to a failure of the primary communications path 110 by substituting the same program content provided by the backup communications path 130. The program provider 102, and service provider 104 are usually owned/controlled by separate entities, and the automation system 202 can be owned/controlled by either the program provider 102 or the service provider 104, or can be owned/controlled by an entity separate from the program provider 102 and the service provider 104.

Figure 3A:
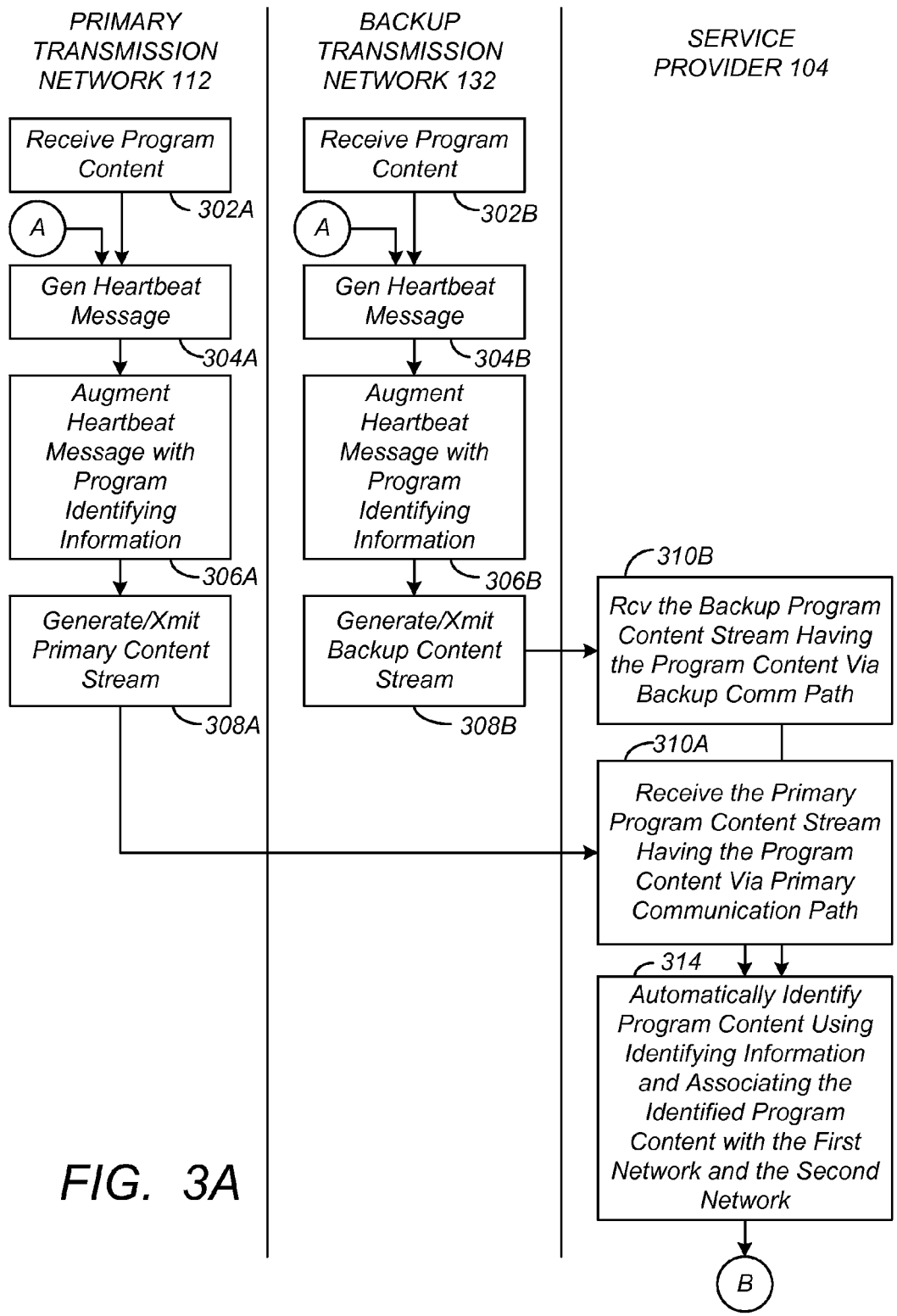
FIGS. 3A and 3B are a diagrams presenting illustrative method steps that can be used by the improved communications system to provide program content to service providers and thereafter to subscribers via the service provider network.
Figure 3B:
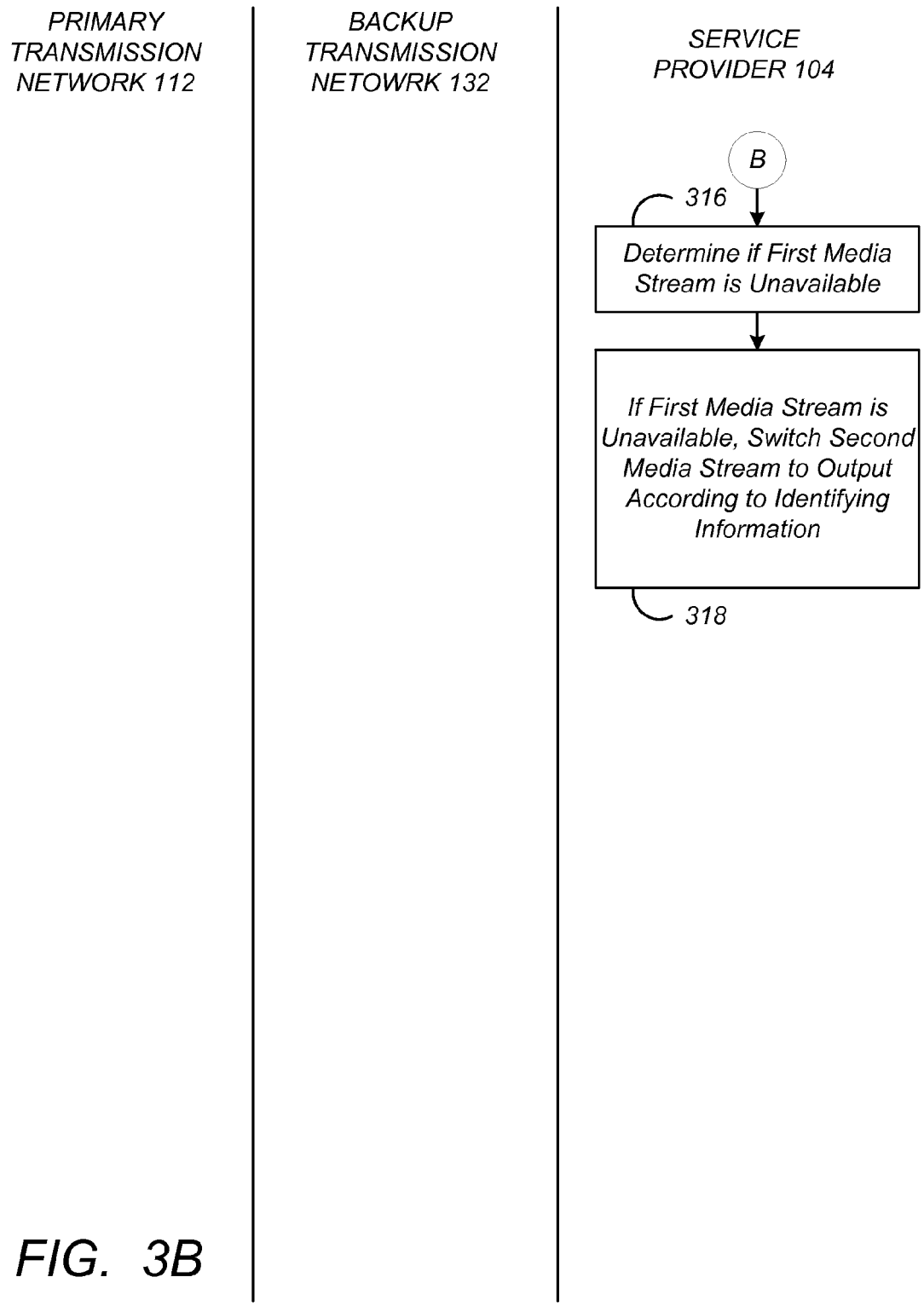

FIGS. 3A and 3B are a diagrams presenting illustrative method steps that can be used by the improved communications system 200 to provide program content to service providers 104 and thereafter to subscribers via the service provider network 106. In block 302A, a first program content stream having the program content is received by the primary transmission network 112 via a primary communication path 110. In block 304A, a heartbeat message is generated for the primary transmission network 112. In one embodiment, this is performed by the modified automation system 202, which may comprise a DigiCipher Event Manager (DEM) produced by the ARRIS Corporation.

In one embodiment, each heartbeat message is a SCTE 35-compliant splice_null( ) message generated and issued by the primary transmission network 112 in response to a SCTE 104-compliant splice_null_request_data( ) message issued (denoted by "A") by the automation system 202. The heartbeat message can alternatively or additionally comprise a splice_insert message generated with a key that is not distributed from the primary transmission network 112 to the service provider.

In block 306A, the heartbeat message is augmented with information that identifies the program content or media program is received in blocks 302A. The heartbeat message is a recurring message that can be generated and transmitted within the program content transport stream upon command or on a recurrent basis.

The aforementioned splice_null( ) command allows transmission of a splice_info_table independent of other commands, and as previously described, this command may also be used as a "heartbeat message" for monitoring cue injection equipment integrity and link integrity. The splice_info_table can carry descriptors such as the segmentation_descriptor( ) described in Table 1 below, as defined in SCTE-35.

TABLE 1

| Syntax | Bits | Mnemonic |
|---|---|---|
| segmentation_descriptor( ) { | | |
|   splice_descriptor_tag | 8 | uimsb |
|   descriptor_length | 8 | uimsbf |
|   identifier | 32 | uimsbf |
|   segmentation_event_id | 32 | uimsbf |
|   segmentation_event_cancel_indicator | 1 | bslbf |
|   reserved | 7 | bslbf |
|   if(segmentation_event_cancel_indicator == '0') { | | |
|     program_segmentation_flag | 1 | bslbf |
|     segmentation_duration_flag | 1 | bslbf |
|     reserved | 6 | bslbf |
|     if(program_segmentation_flag == '0') { | | |
|       component_count | 8 | uimsbf |
|       for(i=0;i<component_count;i++) { | | |
|         component_tag | 8 | uimsbf |
|         reserved pts_offset | 7 | bslbf |
|       } | 33 | uimsbf |
|     } | | |
|     if(segmentation_duration_flag == '1') | | |
|       segmentation_duration | 40 | uimsbf |
|     segmentation_upid_type | 8 | uimsbf |
|     segmentation_upid_length | 8 | uimsbf |

TABLE 1-continued

| Syntax | Bits | Mnemonic |
|---|---|---|
|     segmentation_upid( ) | | |
|         segmentation_type_id segment_num | 8 | uimsbf |
|         segments_expected | 8 | uimsbf |
|     } | 8 | uimsbf |
| } | | |

The segmentation_upid( ) element of the segmentation_descriptor( ) data structure can be modified to include unique program identification (for example, "ProgramX" where X is a unique identifier of the program content). The unique program identification may be in ASCII or other suitable format. Although the identity of the primary transmission network 112 may be inferred by other means (e.g. inferred by the service provider 104 based on known information about where the transport stream is coming from), the segmentation_upid( ) element of the segmentation_descriptor( ) data structure can also include a program provider 102 identifying information (e.g. "ProviderY, where Y is a unique identifier of the program provider 102). An exemplary result would be that the segmentation_upid( ) element includes the term "ProviderY.ProgramX" where Y is an identifier having information sufficient to uniquely identify the provider and X is an identifier having information sufficient to uniquely identify the program content. This can be implemented because the segmentation_upid_type can be user defined.

Notably, this does not require that identifiers X and Y be globally unique at all times. Identifiers X and Y may provide sufficient information to allow the provider and the program content to be uniquely identified when combined with other information. For example, identifier Y may be unique for particular program content provided on a particular date and the same identifier Y may be used for a different program content provided on another date, so long as the service provider 104 is capable of discerning the date and using that information to uniquely identify the program content. It is also noteworthy that other upid (unique program identifier) types may be used. For example, the heartbeat message may be augmented or modified such that the identifying information includes information identifying a satellite 142 and satellite transponder from which the backup program content stream may be obtained, as well as identifying information identifying a data resource that carries the desired backup program stream. As the information transmitted by the satellite may be delineated by frequency division multiplexing (FDMA), time division multiplexing (TDMA), polarization division multiplexing, or code division multiplexing (CDMA) or any combination thereof, the data resource may comprise a frequency, packet identifier, polarization, or code associated with the desired backup program stream.

Returning to FIG. 3A, the primary transmission network 112 then generates the primary content transport stream. This is accomplished by use of encoders 110. The transport stream having primary content stream and the augmented heartbeat information is then transmitted by the primary transmission network 112 via medium 116, as shown in block 308A. In block 310A, the primary program content stream and augmented heartbeat information is received by the service provider 104.

Blocks 302B-310B illustrate complimentary operations performed by the backup transmission network 132 to generate a backup program content transport stream having the same program content (albeit possibly at a different resolution or frame rate) and an optional second heartbeat message. In one embodiment, these operations are performed in parallel (e.g. at the same time) with the operations described in blocks 302A-310A. These operations can be performed using the same program content stream provided from the program provider memory 108, and may be triggered by the same heartbeat messages from the automation system 202 (e.g. SCTE 104-compliant splice_null( ) messages).

Although a second heartbeat message transmitted on the backup communication path 132 is illustrated and described above, the system 200 can also be implemented with heartbeat messages carried solely on the primary communications path 110. This is the case because the heartbeat message provided by the primary communication path 110 may also be augmented to provide additional information that can be used to determine which program content transport stream should be provided at the output of the stream switcher 128. Accordingly, rather than the heartbeat message being augmented to identify the program content stream carried with it, the heartbeat message transmitted in the primary program stream can be augmented with information instead identifying the backup program stream, and preferably, where it can be retrieved from the network transmitting that stream. For example, the heartbeat messages transmitted with the program streams in the primary communication path 110 may simply include the network and program identifier where the backup program stream may be found (e.g. ProviderY.ProgramX), where "ProgramX" identifies the program stream being transmitted by backup network identified by "ProviderY." In the case where the backup communication path 130 is implemented by a satellite transmission system, the heartbeat message for each program stream can be augmented with a satellite identifier, a transponder identifier, and a program ID for the backup program stream.

Returning to FIG. 3A, Block 314 identifies the program content provided in the primary and secondary program content streams using the identification information provided in the heartbeat messages and associates the identified program content with the primary transmission network 102 or the backup transmission network 132. In one embodiment, this is performed by the stream switcher 128. This identification can be made automatically (e.g. without user intervention).

Turning to FIG. 3B, the service provider 104 determines if the primary media stream is unavailable, for example, due to a break in the primary communications path 110. This is shown in block 316.

Figure 4:
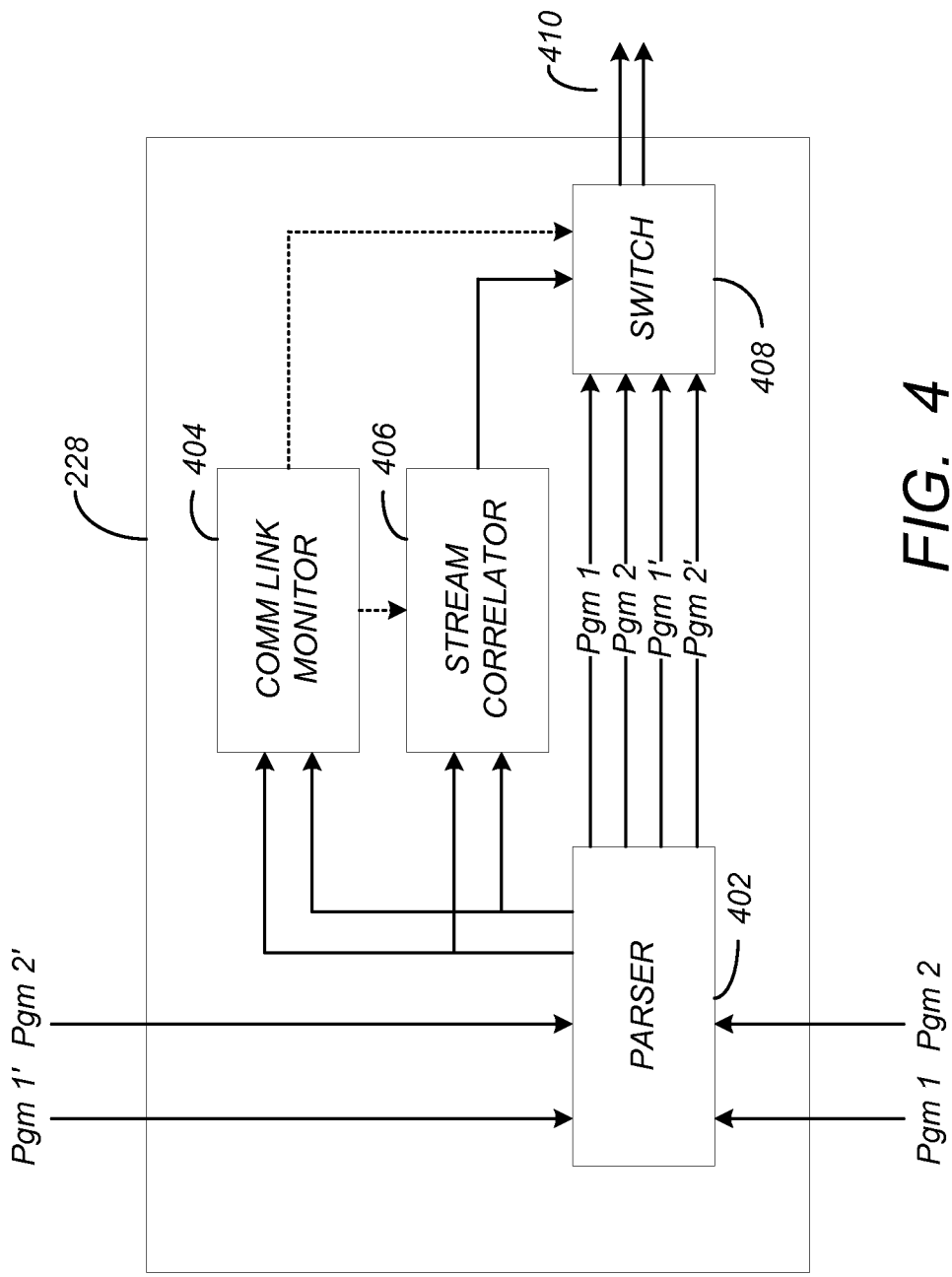
FIG. 4 is a diagram illustrating one embodiment of a stream switcher.

FIG. 4 is a diagram illustrating one embodiment of a stream switcher 228. In the illustrated embodiment, the stream switcher 228 comprises a parser 402 communicatively coupled to a switch 408. The parser 402 receives the primary program streams (Pgm 1 and Pgm 2) having the augmented heartbeat from the primary transmission network 112 via the primary communications path 110, and the backup program streams (Pgm 1' and Pgm 2') having the augmented heartbeat from the backup transmission network 132 via the backup communication path 130. The parser 402 separates the portions of the incoming primary and secondary streams and extracts the program content identifying information from the heartbeat message. The extracted information is provided to a communications link monitor 404 and a stream correlator 406.

The communications link monitor 404 monitors the extracted information to determine if the program streams Pgm 1 and Pgm 2 are no longer being provided to the stream switcher 128. Typically, this occurs because of an outage of the primary transmission network 112, but may also be caused by an outage of any of the elements in the primary communications path 110, including elements of the service provider 104 such as the optional decoders 124 and/or encoders 126.

In one embodiment, the communications link monitor 404 may also rely on health and status information from elements of the primary communication path 110 via information other than that which is provided by the program stream or the heartbeat information. For example, decoders 124 or encoders 126 may report health and status information directly to the stream switcher 128, and that information can be used to determine if the output stream from the stream switcher 128 should be generated from the primary program stream (e.g. Pgm 1 or Pgm 2) or the backup program stream (e.g. Pgm 1' or Pgm 2'). Such information could provide an indication that the primary communication path 110 is in imminent danger of failure, even if it has not yet failed, allowing the stream switcher 128 to prophylactically (e.g. temporally before such a failure) switch to the backup program stream.

The stream correlator 406 uses the program content identification information to associate each primary program content stream (e.g. Pgm 1) with at least one backup program content stream (e.g. Pgm 1'). In one embodiment, the stream correlator 406 attempts to associate the primary and backup program content streams on a continuing basis, and provides the associative information to the switch, whether or not a break in the primary communications path 110 has occurred, and a command signal provided from the communications link monitor 404 triggers switch 408 to select the backup program content transport stream for provision to the output 410 instead of the primary program content transport stream. In another embodiment, the communication link monitor 404 provides a command to the stream correlator 406 to begin to attempt to find a backup program content stream when the communications link monitor 404 detects that a primary communications path 100 failure has occurred or is predicted to occur.

It is noted that although FIGS. 1-4 refer to the use of a primary communications path 110 and a backup communications path 130, multiple backup communication paths may be implemented. Further, after failure of the primary communications path 110, the backup communications path 130 may be designated the current primary communications path, with another of the backup communication paths being designated as the next backup communication path to provide the program content stream should the current primary communications path (and former backup communications path) fail and no longer provide the program content stream.

Application to Retune Messages for Blackout Management

In some cases, program content is licensed for use by according to the location of the customer. In such cases, program content that is approved for dissemination in one region may be disapproved for dissemination in another region. A common example is the broadcast of a live sporting event, which may be broadcast for viewing on a nationwide basis, but must be excluded from the region where the sporting event itself is taking place. Another common example is the broadcast of program content to a particular geopolitical entity may be permitted, whereas the broadcast of the same program content is not permitted in another geographically distinguishable entity, whether because of licensing or political concerns. Such geographically distinguishable entities may be defined by zip code, or geopolitical boundaries. For example, it may be impermissible to transmit program material from the United States to Canada or Mexico.

To assure that program content is not provided for viewing in regions in which such viewing is not permitted, broadcast networks such as the service provider network 106 typically employ a plurality of regional headends, each having a dedicated receiver or IRD for receiving the program stream having the program content intended for that region.

Such blackout systems are preferably dynamic, as some program content (notably sporting events) are themselves dynamic and may begin or end at unexpected times with little if any warning. Hence, it is important for blackout restrictions to be capable of real time or near real time enforcement. Furthermore, although blackouts can be enforced by the service provider 106 pursuant to contractual obligations with the program content providers 102, a means for the program content provider 102 to control and enforce blackout restrictions would be advantageous, at least as an adjunct to any such systems implemented by the service provider.

Figure 5:
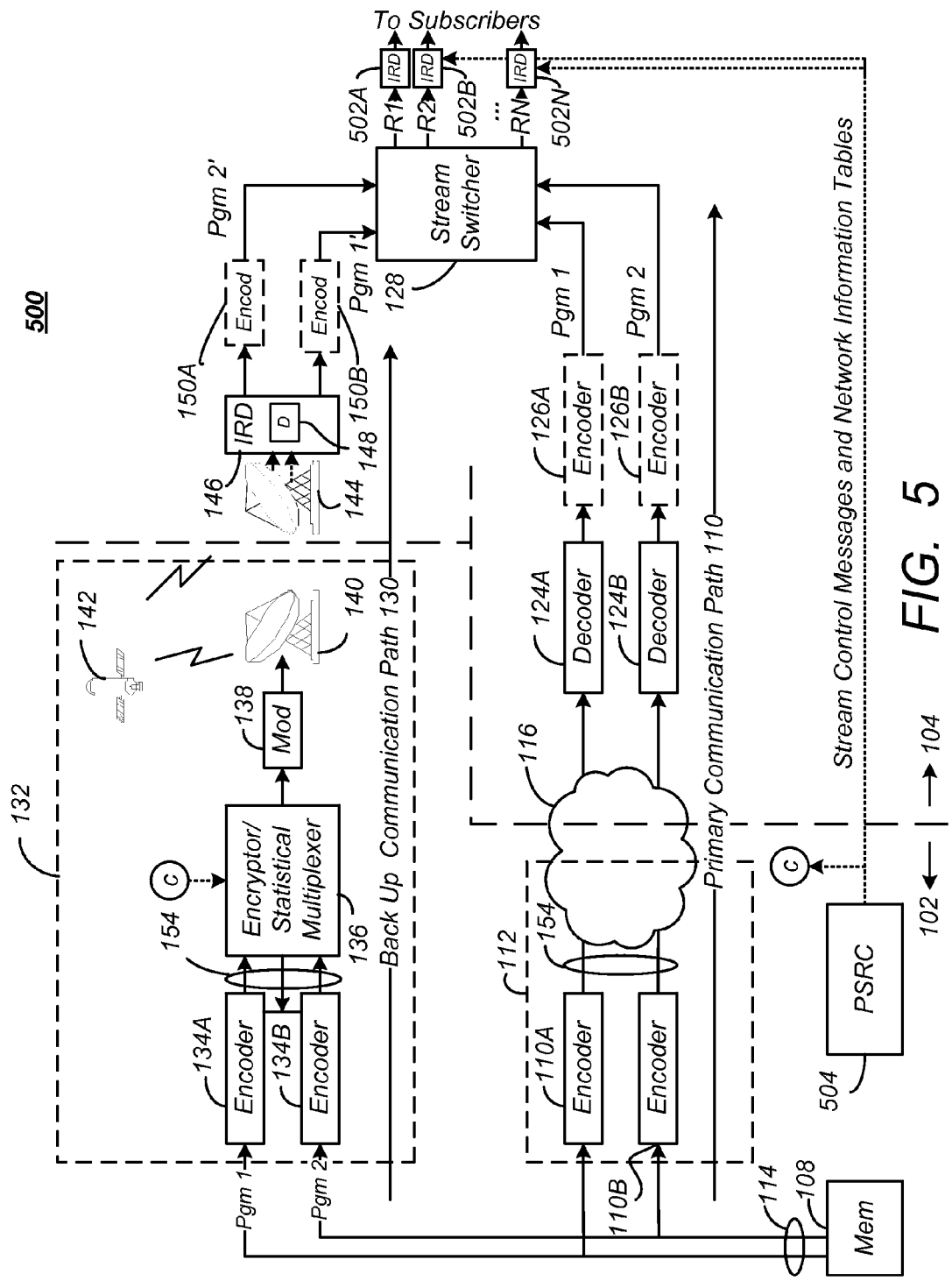
FIG. 5 is a diagram of a communication system for disseminating media content subject to black out restrictions.

FIG. 5 is a diagram of a communication system 500 for disseminating media content subject to blackout restrictions. The communication system 500 transmits program content from one or more sources (such as program providers 102 and/or service providers 104) via one or more communication paths (which may include one or more primary communication paths 110 and one or more backup communication paths 130). As described above with respect to FIG. 2, the communication paths 110 and/or 130 of the alternative communication system 600 include one or more recurring heartbeat messages so that the operational status of the communication paths 110, 130 can be ascertained.

Communications system 500 includes a service network such as service network 106 pictured in FIG. 1 that provides program content to a plurality of regions (R1, R2, . . . RN) by transmission of each program stream having program content to a dedicated receiver or IRD (receivers 502A-502N, respectively). Typically, one or more of the IRDs 502A-502N is dedicated to each program provider 102 or service provider 104.

Each receiver 502A-502N receives the program stream having program content intended for the particular region and does not receive the program stream if the program content is not intended for that particular region. For example, if the program content were a sporting match being held in region R2, the program stream having the sporting match may be delivered to receiver 502A and receiver 502N, but not to receiver 502B, thus enforcing the program content blackout in region R2. Stream control messages and/or network information tables (NITs) commanding which program streams are to be received by the receivers 502A-502N and when can be received from program stream reception controller (PSRC) 504 of the service provider 104. In an embodiment in which the streams are selected via a command to tune to a particular satellite, transponder, polarization, and program or packet identifier, the messages from the PSRC 504 may comprise this information. In other embodiments, the information from the PSRC 504 may include uniform resource locators (URLs), cable channel or other designation of a program source.

One of the disadvantages of this solution to meeting blackout requirements is that a plurality of IRDs 502 are required, and typically, these IRDs 502 are remotely distributed. Further, the stream control messages and network information tables used to command the IRDs must be transmitted to each of the remote IRDs.

Figure 6:
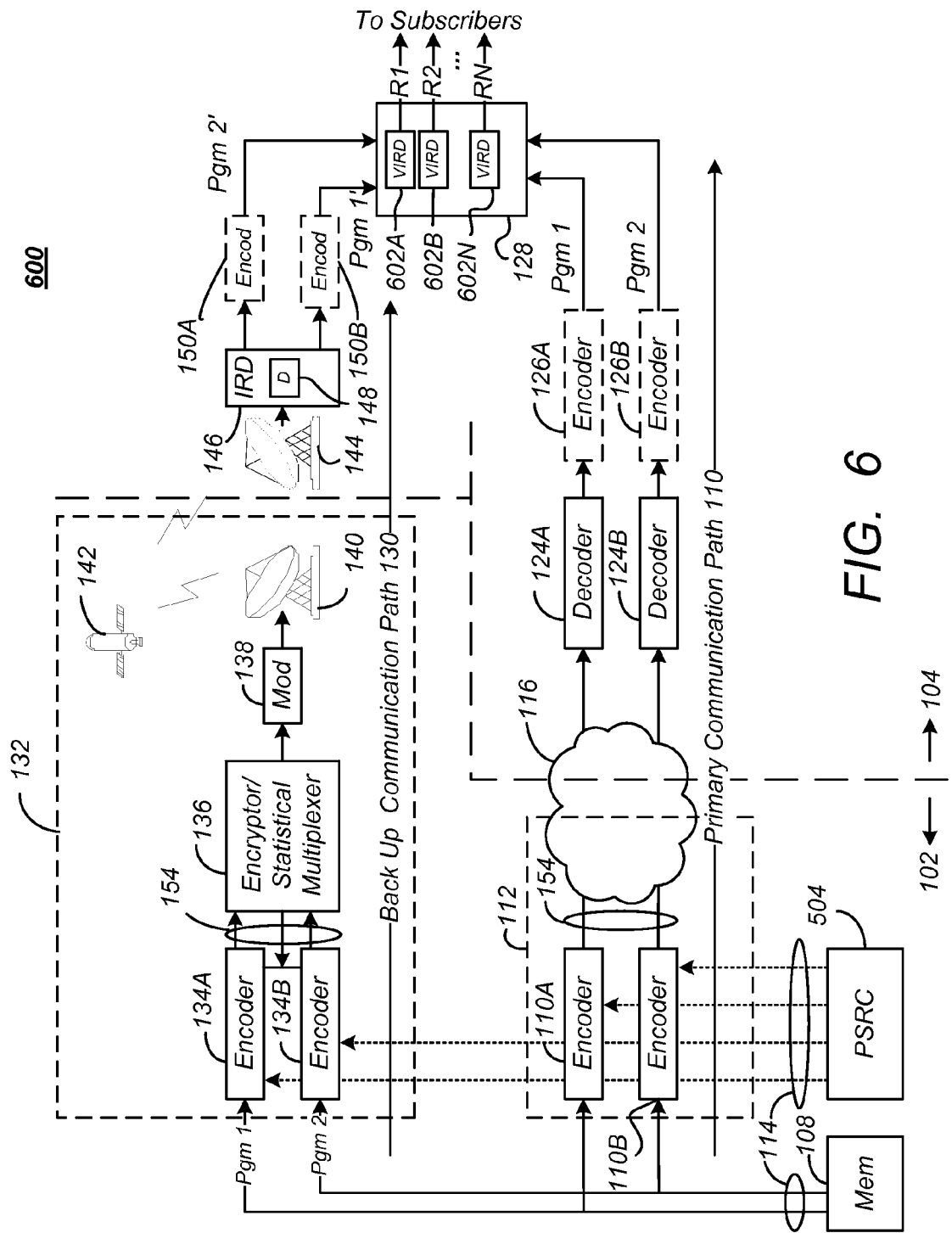
FIG. 6 is a diagram of an alternative communication system for disseminating media content subject to blackout restrictions.

FIG. 6 is a diagram of an alternative communication system 600 for disseminating media content subject to blackout restrictions (hereinafter alternatively referred to as a blackout communications system). The blackout communication system 600 eschews the use of local headends having physical receivers 502A-502N dedicated to each region. Instead, the service provider 104 includes a plurality of virtual receivers 602A-602N, which may be implemented as a part of the stream switcher 228. The virtual IRDs 602 implement a functionality analogous to those of the physical receivers 502A-502N. Also, instead of transmitting stream control messages and network information tables from the PSRC 504 to the IRDs 502, the alternative communication system 600 transmits this information to the virtual IRDs 602 via the primary communication path(s) 110 and/or backup communication path(s) 130 via augmentation of the heartbeat messages, as described further with respect to FIG. 7 below.

Figure 7:
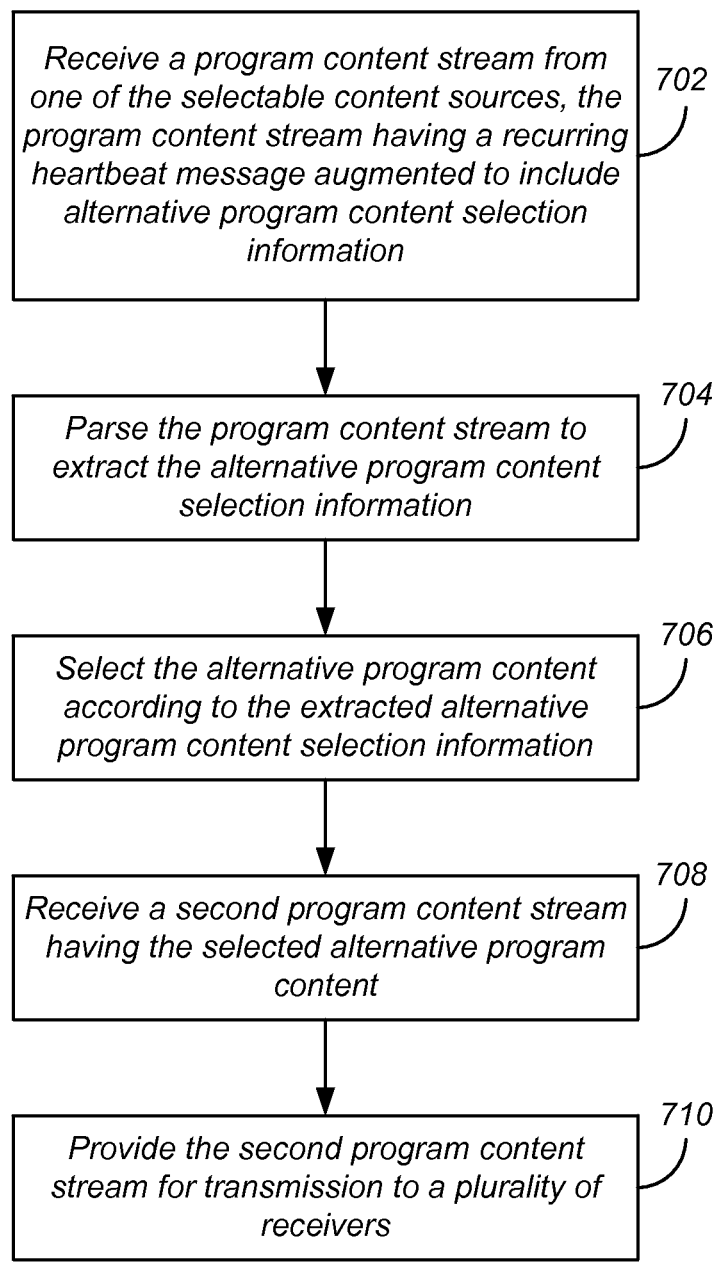
FIG. 7 is a flow chart illustrating one embodiment of how a blackout communications system may be used.

FIG. 7 is a flow chart illustrating one embodiment of how the blackout communications system 600 may be used. In block 702, a program content stream is received from one of a plurality of content sources such as program providers 102 or service providers 106. This may be accomplished, for example by the stream switcher 128 which distributes the received stream to the appropriate virtual IRD 602, or each virtual IRD 602 may receive an associated program stream, for example from a program source that the virtual IRD 602 is dedicated to. The program content stream includes a recurring heartbeat message that has been augmented to include alternative program content selection information. In block 704, the program content stream is parsed to extract the alternative program content selection information. Referring to FIG. 6, this may be accomplished by each of the virtual IRDs 602, each parsing the program content stream that the virtual IRD 602 receives. In block 706, the virtual IRDs 602 select the alternative program content according to the extracted alternative program content selection information.

In one embodiment, the alternative program content selection information comprises "retune" information that is used to "tune" the virtual IRD 602 receiving the program content stream to the proper satellite (e.g. satellite 142) transmitting the alternative program content. Typically, this would include a network identifier, satellite identifier, transponder identifier and program identifier (PID) for the desired program. In other embodiments, the program content selection information may simply include an identifier of the program and/or program source, and other information is used to "retune" the virtual IRD 602 to receive the alternative content. For example, program maps that correlate identifiers to channels can be transmitted to the virtual IRDs 602 and stored for later use. Using such program maps, the information required to switch to the alternative program content may comprise a channel identifier. In still other embodiments, the program content selection information can comprise one or more network information tables. Such network information tables can be defined, for example, by digital video broadcasting standards ETSI-EN 300 468 "Digital Video Broadcasting (DVB), (Specification for Service Information (SI) in DVB systems," published by the European Telecommunications Standards Institute in 2010, which is hereby incorporated by reference herein.

In block 706, the alternative program content is selected according to the extracted program content information. This can be accomplished by the stream switcher 128, and typically, the virtual IRD 602 receiving the program content stream having the alternative program content selection information. In block 708, a second program content stream having the selected alternative program content is received. In one embodiment, this is accomplished by the virtual IRD 602 receiving the program stream using the alternative program content selection included therein to configure the virtual IRD to receive the second program content stream. This can be accomplished by "retuning" the virtual IRD 602 to receive the second program content stream, using the virtual IRD 602 to selecting a different PID (one associated with the second program content stream) from the transport stream, a different URL (at which the second program content stream can be obtained), or other means. In another embodiment, the stream switcher 128 may select the alternative program content and receive the second program content by identifying one of the virtual IRDs 602 that either is tuned to receive the alternate program content or can be commanded to receive the alternate program content, then the switching the output of that identified virtual IRD 602 to the appropriate output R1-RN. For example, if virtual IRD 602A was receiving the initial program content stream and the stream switcher determines that the alternative program content should be provided in place of the initial program content stream (for example, due to a blackout condition), the stream switcher may identify virtual IRD 602B as providing the alternative program content (or command it to do so), and switch R1 to the output of virtual IRD 602B.

Hardware Environment

Figure 8:
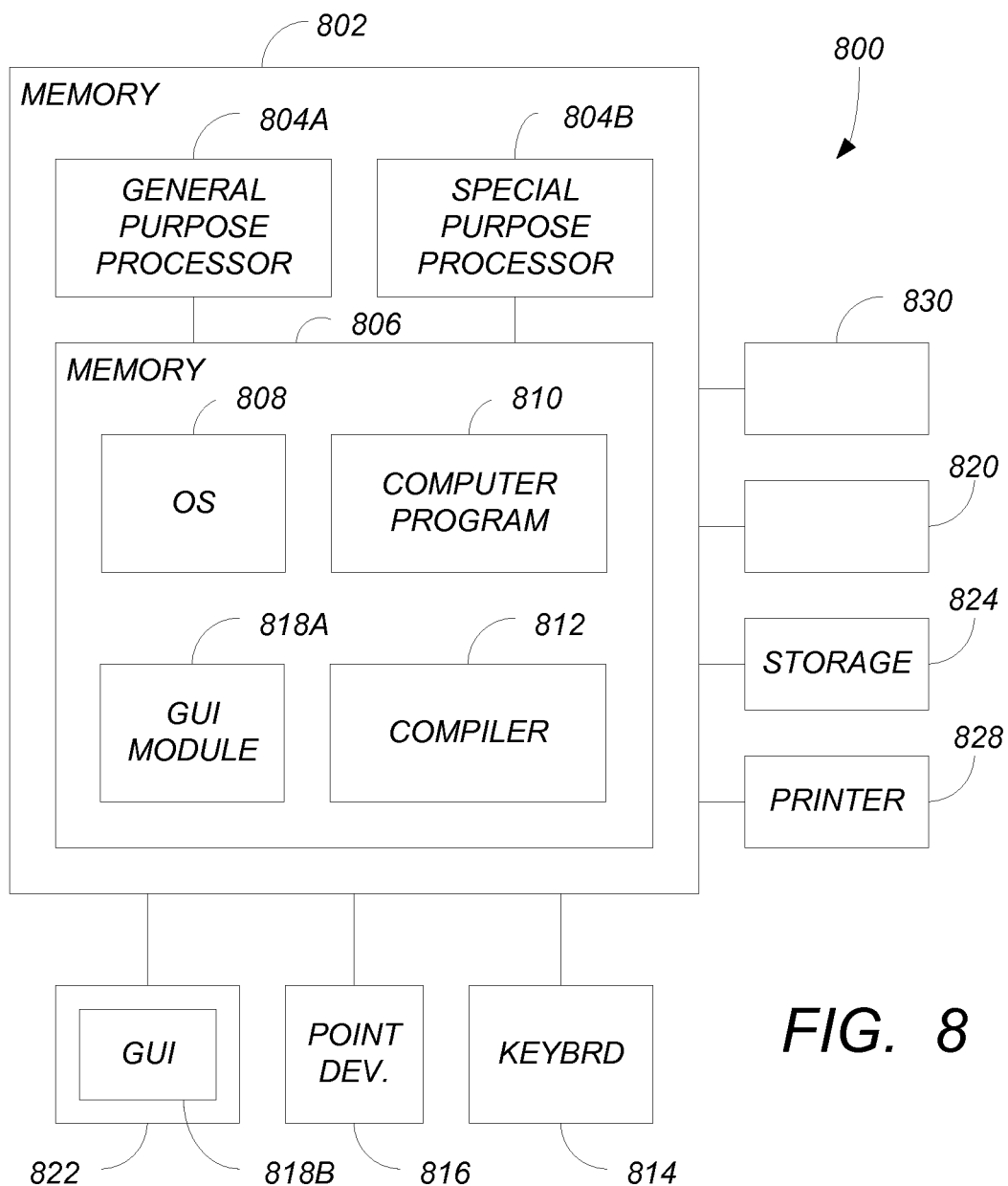
FIG. 8 is a diagram illustrating an exemplary computer system that could be used to implement elements of the present invention.

FIG. 8 is a diagram illustrating an exemplary computer system 800 that could be used to implement elements of the present invention, including elements of the program content provider, the service provider 104, and the service provider network 106. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to other devices, including input/output (I/O) devices such as a keyboard 814, a mouse device 816 and a printer 828.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808 to provide output and results.

Output/results may be presented on the display 822 or provided to another device for presentation or further processing or action. In one embodiment, the display 822 comprises a liquid crystal display (LCD) having a plurality of separately addressable pixels formed by liquid crystals. Each pixel of the display 822 changes to an opaque or translucent state to form a part of the image on the display in response to the data or information generated by the processor 804 from the application of the instructions of the computer program 810 and/or operating system 808 to the input and commands. Other display 822 types also include picture elements that change state in order to create the image presented on the display 822. The image may be provided through a graphical user interface (GUI) module 818A. Although the GUI module 818A is depicted as a separate module, the instructions performing the GUI functions can be resident or distributed in the operating system 808, the computer program 810, or implemented with special purpose memory and processors.

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 802 may also implement a compiler 812 which allows an application program 810 written in a programming language such as COBOL, C++, FORTRAN, or other language to be translated into processor 804 readable code. After completion, the application or computer program 810 accesses and manipulates data accepted from I/O devices and stored in the memory 806 of the computer 802 using the relationships and logic that was generated using the compiler 812.

The computer 802 also optionally comprises an external communication device such as a modem, satellite link, Ethernet card, or other device for accepting input from and providing output to other computers.

In one embodiment, instructions implementing the operating system 808, the computer program 810, and/or the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, or a flash drive. Further, the operating system 808 and the computer program 810 are comprised of computer program instructions which, when accessed, read and executed by the computer 802, causes the computer 802 to perform the steps necessary to implement and/or use the present invention or to load the program of instructions into a memory, thus creating a special purpose data structure causing the computer to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 802.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. In a communication system transmitting program content via communication paths verified as operational via transmission of heartbeat messages, a method of coordinating the presentation of program content received from a first network and a second network independent from the first network, comprising:
   receiving a first program content stream having the program content from the first network via a first communication path, the first program content stream having a recurring first heartbeat message augmented to include identifying information that uniquely identifies the media program;
   receiving at least a portion of a second program content stream having the program content from a second network via a second communication path, the second program content stream having a recurring second heartbeat message including the identifying information; and
   automatically identifying the program content using the identifying information and associating the identified program content with the first network and the second network,
   wherein the first heartbeat message and the second heartbeat message identifying information is transmitted according to an auxiliary content insertion cueing message protocol, and
   wherein the auxiliary content insertion cueing protocol comprises an auxiliary content splice command and the heartbeat identifying information comprises an encrypted splice insert message having an undistributed key.

2. The method of claim 1, wherein the first heartbeat message further comprises a unique identifier of the first network and a unique identifier of the second network, and associating the identified program content with the first network and the second network comprises:
   parsing the first program content stream and the second program stream to extract the identifying information of the media program and associating the identifying information of the media program with the unique identifier of the first network and the second network.

3. The method of claim 1, wherein the auxiliary content insertion cueing protocol comprises an auxiliary content splice command and the heartbeat information comprises a null auxiliary content splice command.

4. The method of claim 1, wherein heartbeat message includes a tuning message comprising the identifying information, and the identifying information comprises information describing a satellite, a satellite transponder, and data identifying a data resource having the program content.

5. An apparatus for coordinating the presentation of program content received from a first network and a second network independent from the first network, the program content transmitted on communication paths verified as operational via transmission of heartbeat messages, the apparatus comprising:

a stream switcher, the stream switcher having:
   a first input coupled to receive a first program content stream having the program content from the first network via a first communication path, the first program content stream having a recurring first heartbeat message augmented to include identifying information that uniquely identifies the media program;
   a second input coupled to receive at least a portion of a second program content stream having the program content via a second network via a second communications path, the second program content stream having a recurring second heartbeat message including the identifying information;
a parser, coupled to the first input and the second input, the parser for parsing the first program content stream and the second program content stream to automatically identify the program content using the identifying information;
a stream correlator, coupled to the parser, for associating the identified program content with the first network and the second network; and
a switch, coupled to the stream correlator, for providing one of the first program content stream and the second program content stream to a stream switcher output according to availability of the first media stream,
wherein the first heartbeat message and the second heartbeat message identifying information is transmitted according to an auxiliary content insertion cueing message protocol, and
wherein the auxiliary content insertion cueing protocol comprises an auxiliary content splice command and the heartbeat identifying information comprises an encrypted splice insert message having an undistributed key.

6. The apparatus of claim 5, wherein the first heartbeat message further comprises a unique identifier of the first network and a unique identifier of the second network, and wherein the parser parses the first program stream and the second program stream for the identifying information of the media program and associates the identifying information of the media program with the unique identifier of the first network and the second network.

7. The apparatus of claim 5, wherein heartbeat message includes a tuning message comprising the identifying information, and the identifying information comprises information describing a satellite, a satellite transponder, and data identifying a data resource having the program content.

* * * * *